United States Patent
Mascolo

(10) Patent No.: US 7,370,107 B2
(45) Date of Patent: May 6, 2008

(54) METHOD FOR USING THE COMPLETE RESOURCE CAPACITY OF A SYNCHRONOUS DIGITAL HIERARCHY NETWORK, SUBJECT TO A PROTECTION MECHANISM, IN THE PRESENCE OF DATA (PACKET) NETWORK, AND RELATING APPARATUS FOR THE IMPLEMENTATION OF THE METHOD

(75) Inventor: Vittorio Mascolo, Lodivecchio (IT)

(73) Assignee: Alcatel, Paris (FR)

( * ) Notice: Subject to any disclaimer, the term of this patent is extended or adjusted under 35 U.S.C. 154(b) by 565 days.

(21) Appl. No.: 10/720,310

(22) Filed: Nov. 25, 2003

(65) Prior Publication Data

US 2004/0213149 A1    Oct. 28, 2004

(30) Foreign Application Priority Data

Apr. 22, 2003    (EP)    ............................. 03290981

(51) Int. Cl.
*G06F 15/173*    (2006.01)
*G06F 11/10*    (2006.01)
*H04L 12/56*    (2006.01)

(52) U.S. Cl. ................ 709/225; 370/395.51; 714/43

(58) Field of Classification Search ........ 709/201–208, 709/226, 225; 370/218, 229–240, 395.51; 713/1, 153, 375, 400, 501–503; 714/43
See application file for complete search history.

(56) References Cited

U.S. PATENT DOCUMENTS 5,175,800 A * 12/1992 Galis et al. .................... 706/45

5,986,783 A * 11/1999 Sharma et al. ................. 398/59
6,202,082 B1 * 3/2001 Tomizawa et al. ........... 709/201

(Continued)

FOREIGN PATENT DOCUMENTS

EP    1 185 014 A2    3/2002

(Continued)

OTHER PUBLICATIONS

Cavendish, D. Murakami, K. Yun, S.-H. Matsuda, O. Nishihara, M., New transport services for next-generation SONET/SDH systems, May 2002, Communications Magazine, IEEE, pp. 80-87.*

(Continued)

*Primary Examiner*—Jason D Cardone
*Assistant Examiner*—Ajay Bhatia
(74) *Attorney, Agent, or Firm*—Sughrue Mion, PLLC

(57) ABSTRACT

The present invention provides for a method and apparatus for using the complete resource capacity of a synchronous digital hierarchy infrastructure, with a protection system, in the presence of a data (packet) network, in which the complete SDH/SONET protection (spare) capacity is used to carry data traffic in both normal and failure conditions.

In case of failure the working capacity is cut, and the TDM traffic is subject to a protection mechanism and is shifted over the protection capacity; the part of high (and medium) priority data traffic is shifted over the protection capacity; a part of the data low-priority extra-traffic (transported over the protection capacity in normal conditions) will share the remaining protection capacity with the low-priority best-effort part of the data traffic transported over the working capacity.

3 Claims, 4 Drawing Sheets

U.S. PATENT DOCUMENTS

| | | | |
|---|---|---|---|
| 6,343,068 B1 * | 1/2002 | Yamamoto et al. | 370/242 |
| 6,587,470 B1 * | 7/2003 | Elliot et al. | 370/404 |
| 6,606,660 B1 * | 8/2003 | Bowman-Amuah | 709/227 |
| 6,785,225 B1 * | 8/2004 | Sugawara et al. | 370/225 |
| 6,917,583 B2 * | 7/2005 | Suzuki | 714/2 |
| 6,917,759 B2 * | 7/2005 | de Boer et al. | 398/5 |
| 6,925,054 B1 * | 8/2005 | Atterton et al. | 370/218 |
| 6,934,248 B1 * | 8/2005 | DeBoer et al. | 370/217 |
| 6,973,028 B1 * | 12/2005 | Huai et al. | 370/222 |
| 7,072,580 B2 * | 7/2006 | Arecco et al. | 398/4 |
| 2001/0033548 A1 * | 10/2001 | Saleh et al. | 370/218 |
| 2002/0080445 A1 * | 6/2002 | Falkenstein et al. | 359/127 |
| 2002/0097680 A1 * | 7/2002 | Liu et al. | 370/238 |
| 2002/0109878 A1 * | 8/2002 | Qiao | 359/118 |
| 2002/0118637 A1 * | 8/2002 | Manganini et al. | 370/222 |
| 2002/0133698 A1 * | 9/2002 | Wank | 713/151 |
| 2002/0165962 A1 * | 11/2002 | Alvarez et al. | 709/226 |
| 2003/0016623 A1 * | 1/2003 | Grover et al. | 370/216 |
| 2004/0190446 A1 * | 9/2004 | Ansorge et al. | 370/228 |
| 2005/0063299 A1 * | 3/2005 | Atkinson et al. | 370/216 |

FOREIGN PATENT DOCUMENTS

EP 1 282 249 A2 2/2003

OTHER PUBLICATIONS

Antonopoulos, A.; O'Reilly, J.J.; Lane, P., An algorithmic approach for the planning of partial access ETSI SDH SNCP-ring subnetworks, Jun. 30-Jul. 2, 1998, Computers and Communications, 1998. ISCC '98. Proceedings. Third IEEE Symposium, pp. 193-197.*

White, J.; Zukerman, M.; Hai Le Vu, "A framework for optical burst switching network design," Communications Letters, IEEE , vol. 6, No. 6, pp. 268-270, Jun. 2002.*

Lea, C.-T., "What should be the goal for ATM," Network, IEEE , vol. 6, No. 5, pp. 60-66, Sep. 1992.*

ITU_T G.841 Series G: Transmission Systems and Media, Digital Systems and Networks, Digital transmission systems—Digital Networks—SDH network characteristics "Types and Characteristics of SDH Network Protection Architectures", Oct. 1998, pp. 1-132.

* cited by examiner

METHOD FOR USING THE COMPLETE RESOURCE CAPACITY OF A SYNCHRONOUS DIGITAL HIERARCHY NETWORK, SUBJECT TO A PROTECTION MECHANISM, IN THE PRESENCE OF DATA (PACKET) NETWORK, AND RELATING APPARATUS FOR THE IMPLEMENTATION OF THE METHOD

TECHNICAL FIELD

The present invention relates to a method for using the complete resource capacity of a synchronous digital hierarchy network, subject to a protection mechanism, in the presence of a data (packet) network, and relating apparatus for the implementation of the method.

This application is based on, and claims the benefit of, European Patent Application No. 03290981.4 filed on Apr. 22, 2003 which is incorporated by reference herein.

BACKGROUND OF THE INVENTION

When a data packet network is deployed over a synchronous digital hierarchy network (as SDH or SONET) infrastructure, both TDM (Time Division Multiplex) and Data (packet) traffic are carried. In the following the synchronous digital hierarchy network will be identified with the term SDH/SONET.

In the SDH/SONET network, when it is organized in a ring configuration, one of the most common protection systems deployed is the well known MS-SPRING protection mechanism, as described in the standard ITU-T G.841, whereby the transport capacity is divided between Working and Protection capacity/channels. Every Working channel has a corresponding Protection channel to be used by the MS-SPRING protection mechanism to restore the traffic of the working channel in case of failure.

In normal non-failure conditions the Working channels carry data and TDM traffic, and the Protection channels may be used to carry the so-called low-priority "extra-traffic".

However in case of failure, the low-priority "extra-traffic" in the protection channels is pre-empted by the MS-SPRING protection mechanism to allow restoration of the traffic of the Working channels.

Therefore this protection mechanism has the main drawback that in practice 50% of the global SDH/SONET capacity resources are wasted and typically are not used for transporting traffic, just because this traffic should have to be pre-empted in case of failure, this way reducing drastically the reliability of the transmission of the extra-traffic.

This problem is particularly important due to the strong need to transport data over SDH/SONET, and therefore the SDH/SONET capacity must be used in a more efficient way.

The same considerations are applicable to the more general situation of ring or meshed networks with other types of protection deployed, such as ring SNCP (Sub-Network Connection Protection) where a protection capacity is shared among N working capacities.

SUMMARY OF THE INVENTION

Therefore the main object of the present invention is to provide a method for using the complete resource capacity of SDH/SONET network, subject to a protection mechanism, in the presence of a data (packet) network.

This object is achieved by a method method for using the complete resource capacity of a synchronous digital hierarchy network, subject to a protection mechanism, in the presence of a data (packet) network, said network comprising nodes bidirectionally transmitting TDM and Data traffic over Working and Protection capacity/channels, wherein said method comprises the following steps, in case of failure at the affected nodes:

the working capacity is cut;
the TDM traffic is subject to said protection mechanism, and is shifted over the protection capacity;
a part of high priority data traffic is shifted over the protection capacity;
a part of low-priority data traffic, transported over the protection capacity in normal conditions, is caused to share the remaining protection capacity with the low-priority part of the data traffic, transported over the working capacity in normal conditions, in such a way as the complete protection capacity is used to carry data traffic in both normal and failure conditions.

A further object is to provide an apparatus for the implementation of the method.

This object is achieved by a network node for carrying out the method of claim 1, wherein said network node comprises:

a first switching element to switch the TDM traffic over the TDM part of the working channels, in the non-failure condition, or over the protection capacity in case of failure;
a second switching element for the data traffic, comprising circuits to perform the following actions:
recognizing the class of service of the input data, said high or low priority data traffic;
assigning the data traffic to the correct output on said working or protection capacity in both non-failure and failure conditions, so as in failure conditions all the high priority data traffic is switched over the protection capacity, and the low priority data traffic is switched over the protection capacity according to said function of statistical multiplexing.

The basic idea of the present invention is to use the complete SDH/SONET protection (spare) capacity to carry data traffic in both normal and failure conditions.

More in detail in non-failure conditions the working capacity carries TDM and every type of data traffic (high, medium, low priority), while the protection one can transport only low priority data traffic.

In case of failure the working capacity is cut, and:
the TDM traffic is subject to the known protection mechanism and is shifted over the protection capacity;
the part of high (and medium) priority data traffic is shifted over the protection capacity;
a part of the data low-priority extra-traffic (transported over the protection capacity in normal conditions) will share the remaining protection capacity with the low-priority best-effort part of the data traffic transported over the working capacity.

In a variant embodiment the protection capacity carries also the below defined NUT (Not pre-emptable unprotected traffic) data traffic in both normal and failure conditions.

The method subject of the invention is applicable to any kind of SDH/SONET networks, ring or meshed, physical or virtual, and with any known protection mechanisms deployed, like MS/SPRING, SNCP, or others.

These and further objects are achieved by means of a method and apparatus as described in the attached claims, which are considered an integral part of the present description.

BRIEF DESCRIPTION OF THE DRAWINGS

The invention will become clear from the following detailed description, given by way of a mere exemplifying and non limiting example, to be read with reference to the attached drawing figures, wherein.

BEST MODE OF CARRYING OUT THE INVENTION

Figure 1:
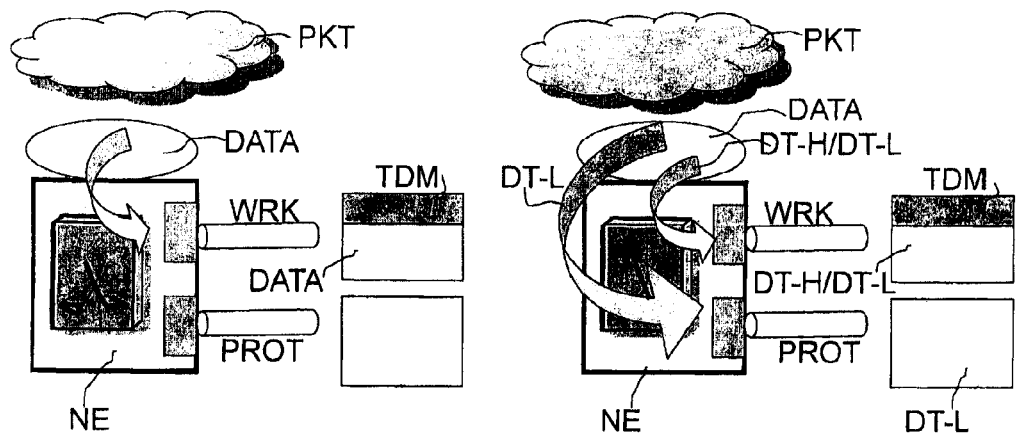
FIG. 1 shows a schematic view of a known SDH/SONET node of a ring-like network.

With reference to FIG. 1, NE shows a schematic view of a known SDH/SONET node of a ring-like network, in which the known MS/SPRING protection mechanism is deployed. The ring may be a phisical ring or a virtual ring, that's a sub-network built on a physical meshed topology.

Between the nodes the connection resources are provided through working connection capacity WRK and protection (spare) connection capacity PROT, the protection connection capacity being normally equal to the working one.

When a data packet network PKT is deployed over the SDH/SONET ring infrastructure, both TDM (Time Division Multiplex) and data traffic DATA have to be carried on the SDH/SONET ring. The data traffic may have different levels of Classes of Service CoS, depending on the level of priority/importance.

In the following, reference is made to the following three known Classes of Service: High Priority, Medium Priority, Low (best-effort) Priority class of service, even if it is clear that any different subdivision may apply.

The High priority is a data traffic with guaranteed bandwidth and full protection to be applied, like the TDM traffic; the Medium priority CoS is a data traffic with two traffic components, the one with guaranteed bandwidth like the high one, the other with non-guaranteed bandwidth; the Low priority CoS is a best-effort data traffic with non-guaranteed bandwidth.

In the following the data traffic will be indicated by DT-H, that is the High priority CoS and the first part of Medium priority CoS with guaranteed bandwidth and full protection, and DT-L, that is the second part of Medium priority CoS and the Low priority CoS with non-guaranteed bandwidth.

In the normal non-failure conditions, the working capacity WRK carries all the TDM and data traffic DT-H, and possibly a part of the data traffic DT-L, depending on the total capacity, while the protection (spare) capacity PROT may or may not be used for carring extra data traffic DT-L (in the following, extra-traffic DT-L), depending on the above described pre-emption problem.

Figure 2:
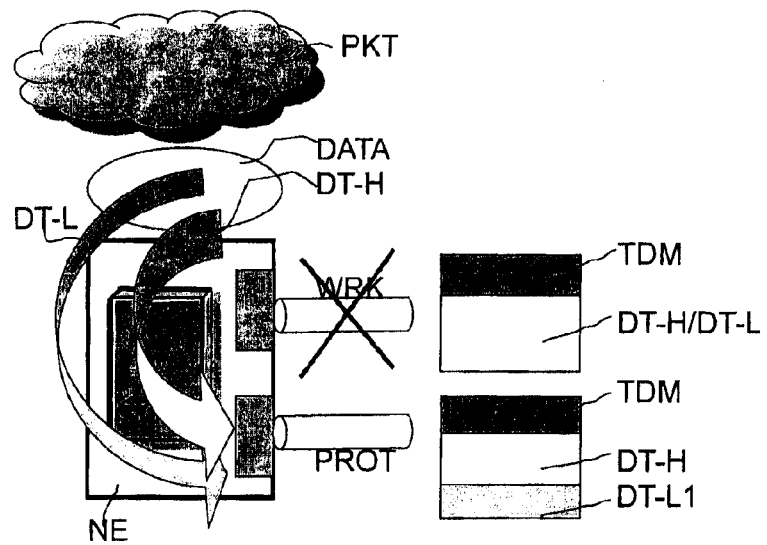
FIG. 2 shows the behaviour of the SDH/SONET node in case of failure, according to a first variant of the invention.

With reference to FIG. 2, a first embodiment of the invention is described, relating to the case of spare capacity PROT used to carry best-effort Class of data traffic. In case of failure the working capacity WRK is cut, and:

the TDM traffic is subject to the known MS/SPRING protection mechanism whereby it is shifted as such over the protection capacity PROT;

the data traffic DT-H is shifted over the protection capacity PROT, like TDM;

a part of the extra-traffic DT-L which was transported over the spare capacity PROT will share the remaining protection capacity PROT with the data traffic DT-L transported over the working capacity WRK (now protected), according to a sharing mechanism described below. In this way the best-effort traffic is not pre-empted, so there is not a service interruption, but only a service degradation due to the sharing of the available transport resources of the remaining part DT-L1 of the protection capacity PROT.

Figure 3:
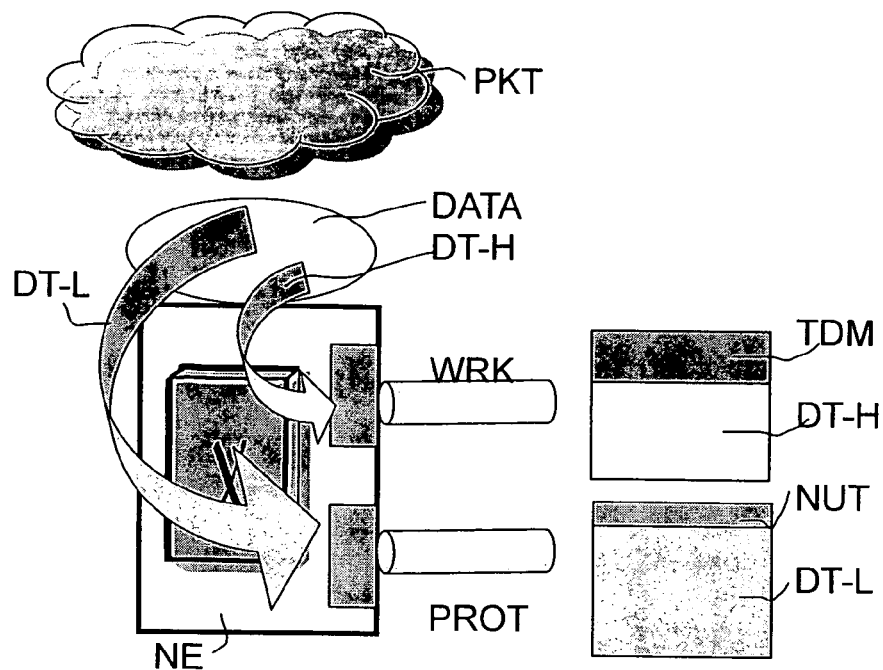
FIGS. 3 and 4 show the behaviour of the SDH/SONET node, according to a second variant of the invention, with presence of the NUT data traffic component.

With reference to FIG. 3, a second embodiment of the invention is described, relating to the case when a part of the protection capacity PROT is reserved to carry the so-called NUT (Not pre-emptive Unprotected Traffic) data traffic which can not be used nor pre-empted by the MS-SPRING mechanism. The NUT capacity is used only by the data network and if necessary may be subject to a protection mechanism at level L2 layer (i.e. RPR, ATM, . . . ).

Figure 4:
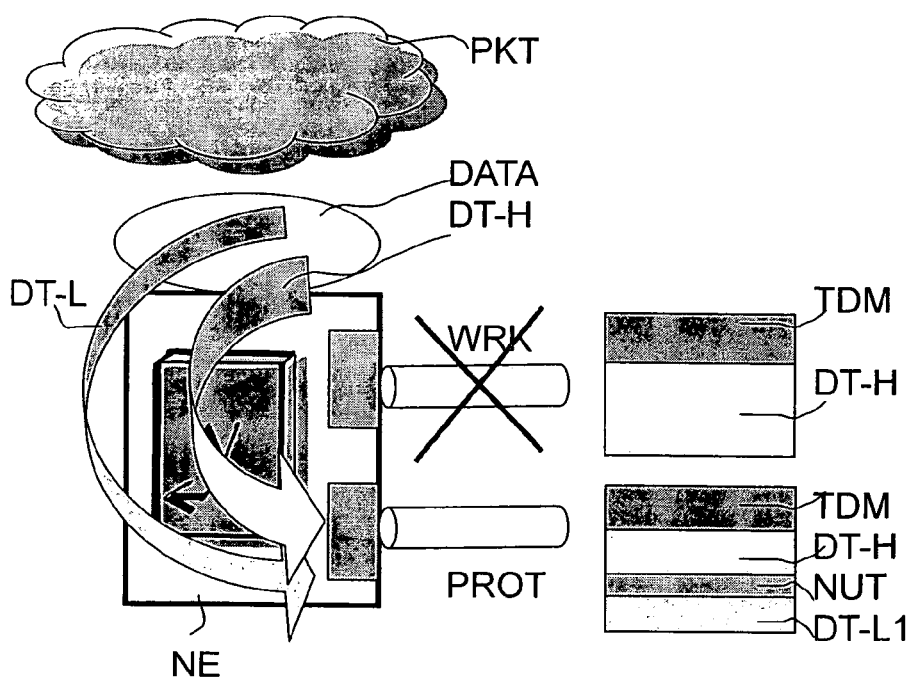

With reference to FIG. 4, in case of failure, the working capacity WRK is cut, and the protection capacity PROT is used as in the embodiment of FIG. 1, but the NUT part which is not available and must be left as it is.

As a non limiting example, let's suppose this scenario: we have to transport 10% of TDM traffic and 80% of data traffic by using a typical 2F MS/SPRING protected SDH/SONET ring infrastructure (X capacity with X=155, 622, 2400, 10000 Mbps). In the traditional known approach the 50% of X is used as spare capacity, and not available. According to this proposal only 10% of this capacity is used as spare capacity (to protect the TDM traffic that is 10% of the total. The remaining capacity is shared by the different types of data traffic.

Figure 5:
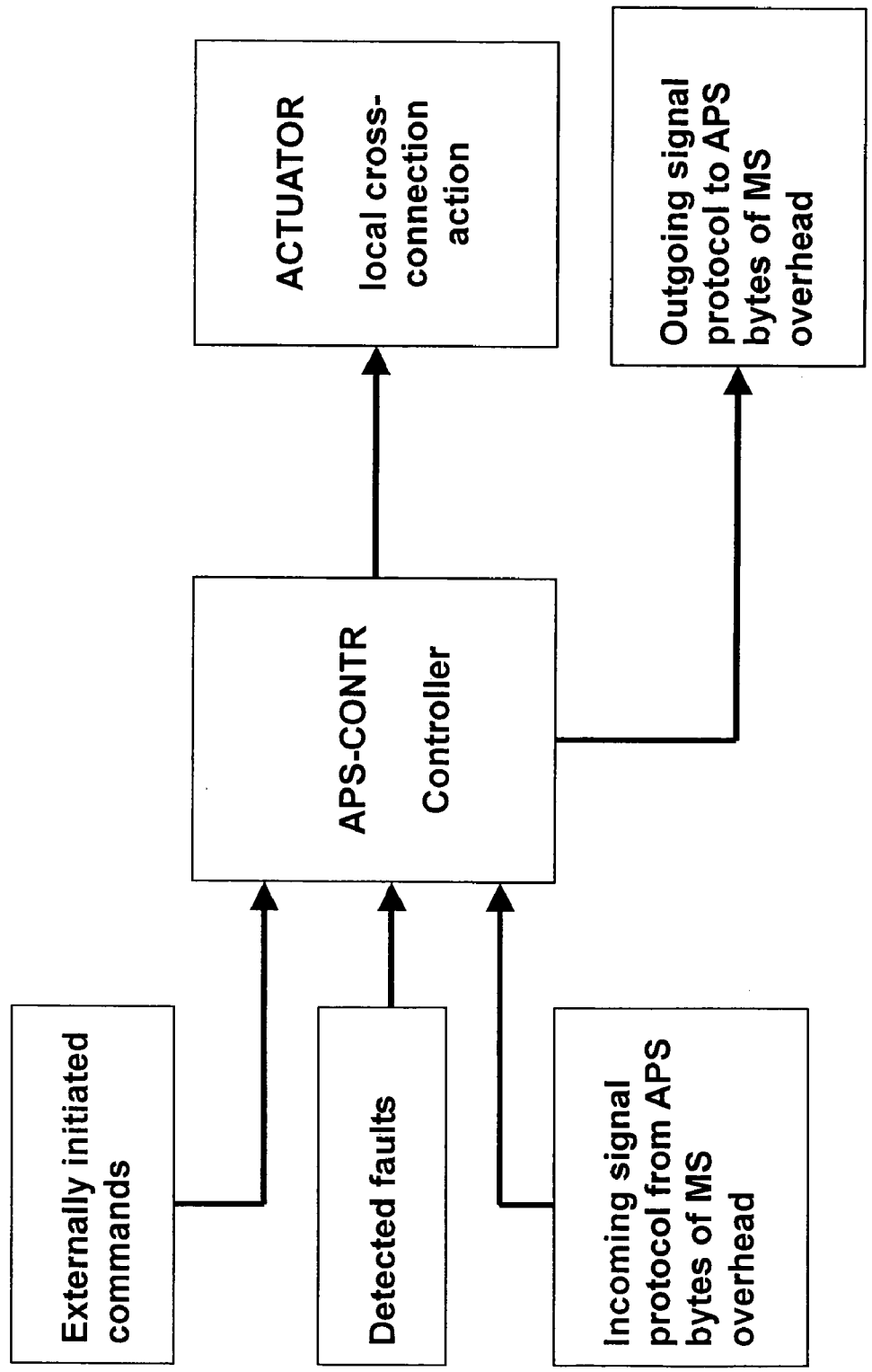
FIGS. 5, 6 and 7 show the internal constitution of a SDH/SONET node, to implement the invention.
Figure 6:
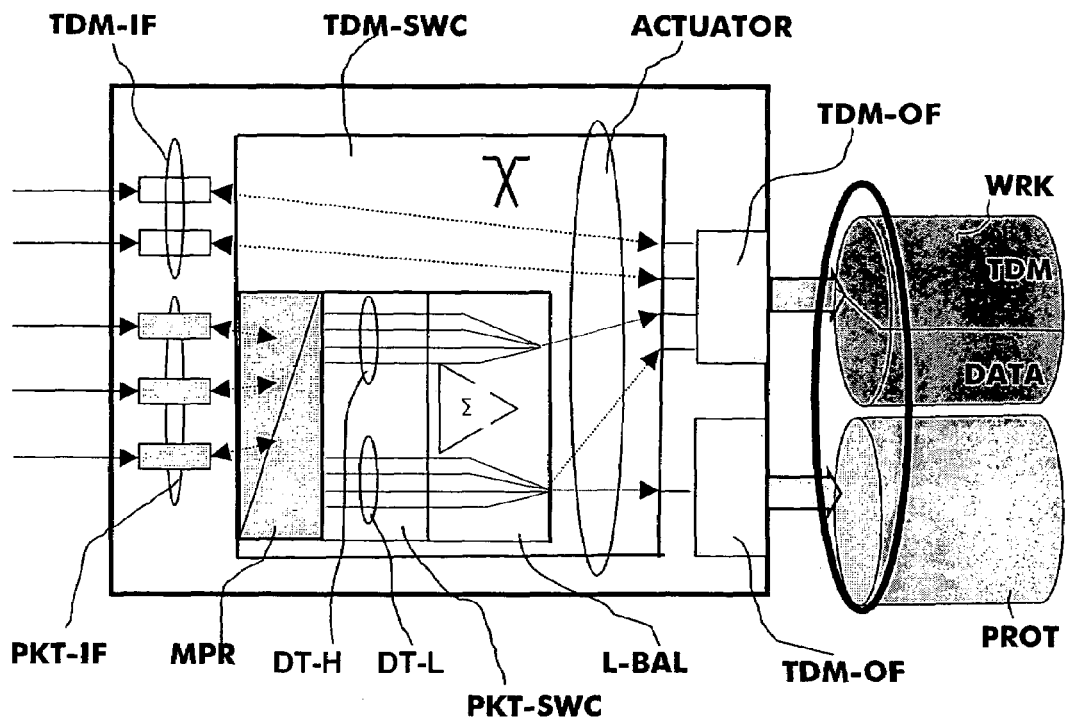
Figure 7:
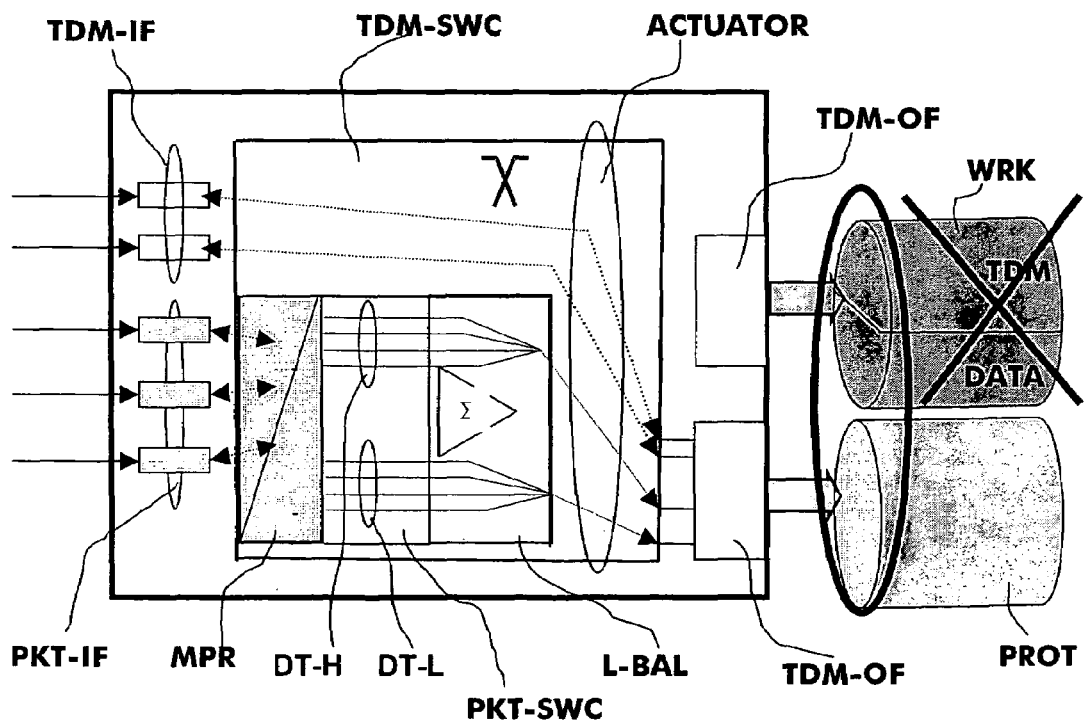

With reference to FIGS. 5, 6 and 7, it is described in the following how the network element NE works to implement the method according to the invention.

The subsystem of a network element NE that manages the MS-SPRING protection mechanism can be represented as shown in FIG. 5: it comprises basically an APS Controller APS-CONTR module and an Actuator ACTUATOR module.

The APS-CONTR module, by running the known APS engine on each network element NE of the network, manages the signal protocol used by the MS-SPRING protection mechanism, according to the SDH/SONET bi-directional ring protocol (standard ITU-T G.841).

The APS-CONTR module is basically a state machine running the APS engine which analyzes input data coming from:

incoming signal protocol from APS bytes of the MS overhead of the SDH/SONET frames;

externally initiated commands;

detected faults on working and/or protection channels.

The APS-CONTR module must develop, according to the ITU-T G.841 rules, the outgoing signal protocol to the APS bytes of the MS overhead of the outgoing SDH/SONET frames, and the further "local actions" to be performed by the ACTUATOR module over the connection matrix of the cross-connect in the network element, namely it must establish the new matrix connections (for the network element) in order to restore the failed working connectivity according to the MS-SPRING protocol rules.

The behaviour of the APS-CONTR subsystem is therefore such that:

the Fault detector signals the trigger events for the APS state machine;

the APS state machine runs the signal protection protocol, according to the ring status and the trigger events;

the APS state machine according to the new ring status, the traffic maps, and the ring topology acts to heal the working connections by operating on the cross-connection through the actuator.

As it will be described in the following, the APS-CONTR module of the MS-SPRing mechanism is not affected by the present invention, it behaves like in the known way. Only the Actuator ACTUATOR module is affected.

FIGS. 6 and 7 show the internal constitution of the switching part TDM-SWC of the network element NE, and how it works according to the invention respectively in the non-failure and failure condition.

TDM-SWC comprises a switching part for the TDM traffic, coming from the input interfaces TDM-IF and switched to the output interfaces TDM-OF sending TDM traffic over the TDM part of the working channels WRK, in the non-failure condition.

The passthrough traffic is not depicted for simplicity, since it is described the behaviour for a node that sources the traffic.

TDM-SWC further comprises a switching sub-system PKT-SWC for the data traffic coming from the input interfaces PKT-IF.

PKT-SWC comprises:
an input mapper module MPR which recognizes the class of service of the input data traffic, High (and medium) DT-H or low DT-L priority traffic. The high priority part of the data traffic is carried over the DATA part of the working capacity WRK in non-failure conditions, since it must be protected. The low priority part can be carried over either the DATA part of the working capacity WRK or the spare capacity PROT, since being best effort traffic it could be not protected;
a load balancer module L-BAL which has the task of assigning the data traffic to the correct output interfaces TDM-OF in both non-failure and failure conditions.

In practice the load balancer L-BAL task is to:
divide the high priority from the low priority data by mapping them in different VCs (Virtual Containers) of the SDH/SONET frames, the ones belonging to the working capacity and the others belonging to the spare capacity;
apply a function of statistical multiplexing for the low priority data traffic to access the dedicated VCs; this function can be the known Statistical Time Division Multiplexing (STDM): it is a form of time division multiplexing in which a given data stream can obtain more or less bandwidth dynamically, based on its needs and on the demands of other data streams; it is known and used in devices such as outers, LAN switches, and frame relay switches.
balance the low priority data traffic in both non-failure and failure conditions.

In the known systems, in case of failure and a consequent protection switch, the working traffic will access the protection channels causing extra traffic to be removed from the protection channels.

More in detail in the known MS-SPRing system the nodes adjacent to the failure manage a so-called "bridge" and "switch" action. All the other nodes (intermediate node) are not involved in the protection process; they only make a pre-emption of their extra traffic, establishing the pass-through connections over the protection channel. By consequence under protection switching (of both span and ring type) all the protection channels are used to restore the working one.

Instead, according to the invention, only the TDM traffic and the high priority component of the data traffic must be protected; their total contribution must be less than the total working capacity.

With reference to FIG. 7, in case of failure, the TDM and DT-H traffic will be rerouted on the spare capacity PROT and the remaining part of PROT will be used to carry DT-L traffic. Of course the low priority component DT-L will be accordingly managed to guarantee the spare resources to the protected traffic (both TDM and DT-H), by applying the above described function of statistical multiplexing.

To allow this feature, the Actuator engine of MS-Spring will be affected.

In the known MS-SPRing system the Actuator engine, after receiving the starting command from the APS engine, performs the following actions on all the spare capacity connections, in case of failure:
Squelch all the low priority traffic (force AIS to avoid mis-connection);
Bridge and Switch—it acts the cross-connection capability to restore the working traffic—all the spare capacity resources are used to restore the working ones.
remove AIS.

According to the invention, the Actuator engine ACTUATOR of FIG. 5, also shown in FIGS. 6 and 7, performs the following actions on the spare capacity connections, in case of failure:
Squelch partially the low priority traffic (force AIS not on the overall capacity), pre-empting only the part necessary for protection of TDM and DT-H traffic.
Bridge and Switch—it acts the cross-connection capability to restore the working traffic (TDM and DT-H)—not all the spare capacity resources are used to restore the working ones.
remove AIS.
Balance the access for the low priority data traffic to the remaining spare capacity by statistical multiplexing.

In case of presence of the NUT traffic component, the block PKT-SWC manages NUT in a known way, so as to allocate it in the PROT capacity.

The load balancer L-BAL and the Actuator provide for arranging the various traffic components in the PROT capacity, keeping the NUT component unaffected in both normal and failure conditions.

Further implementation details will not be described, as the man skilled in the art is able to carry out the invention starting from the teaching of the above description.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

For example the same technique is applicable to the more general situation of a ring or meshed network with other types of protection deployed, such as ring SNCP (Sub-Network Connection Protection), where a protection capacity is shared among N working capacities. Also in the case of the known N:1 protection mechanism, the first working capacity which is shifted on the relating protection capacity following to a failure, behaves like in the case described in the above example in the known systems, therefore can be subject to the use of the complete protection resource capacity of the method subject of the invention.

The invention claimed is:

1. A method for using the complete resource capacity of a synchronous digital hierarchy network, subject to a protection mechanism, in the presence of a data packet network, said network comprising nodes bidirectionally transmitting time division multiplex (TDM) and data traffic over Working and Protection capacity/channels, wherein in case of a failure at the affected nodes, said method comprising:

cutting the working capacity;

subjecting the TDM traffic to said protection mechanism, and shifting the TDM traffic over the protection capacity;

shifing a part of high priority data traffic over the protection capacity; and a part of low-priority data traffic, transported over the protection capacity in normal conditions, shares a remaining protection capacity with a low-priority part of the data traffic, transported over the working capacity in normal conditions, wherein the complete protection capacity is used to carry data traffic in both normal and failure conditions, wherein in said network nodes, an Actuator function is performed on a connection matrix of a cross-connect, whereby in case of a failure, new matrix connections to the protection capacity are established in order to restore the failed working capacity, said Actuator function causing the performing of the following actions on said protection capacity, in case of a failure:

squelching partially the low priority traffic, present before the failure, and pre-empting only a part of the low priority traffic necessary for carrying said TDM and said high priority data traffic;

Bridge and Switch comprising acting on the cross-connection matrix to restore the TDM and high priority data traffic; and balancing the access for the low priority data traffic to the remaining spare capacity by said statistical multiplexing.

2. A method for using the complete resource capacity of a synchronous digital hierarchy network, subject to a protection mechanism, in the presence of a data packet network, said network comprising nodes bidirectionally transmitting time division multiplex (TDM) and data traffic over Working and Protection capacity/channels, wherein in case of a failure at the affected nodes, said method comprising:

cutting the working capacity;

subjecting the TDM traffic to said protection mechanism, and shifting the TDM traffic over the protection capacity;

shifting a part of high priority data traffic over the protection capacity; and a part of low-priority data traffic, transported over the protection capacity in normal conditions, shares a remaining protection capacity with a low-priority part of the data traffic, transported over the working capacity in normal conditions, wherein the complete protection capacity is used to carry data traffic in both normal and failure conditions, reserving a part of the protection capacity to carry Not pre-emptive Unprotected Traffic (NUT) data traffic during a normal condition and a failure condition wherein in said network nodes, an Actuator function is performed on a connection matrix of a cross-connect, whereby in case of a failure, new matrix connections to the protection capacity are established in order to restore the failed working capacity, said Actuator function causing the performing of the following actions on said protection capacity, in case of failure:

squelching partially the low priority traffic, present before the failure, and pre-empting only a part of the low priority traffic necessary for carrying said TDM and high priority data traffic;

Bridge and Switch comprising acting on the cross-connection matrix to restore the TDM and high priority data traffic; and balancing the access for the low priority data traffic to the remaining spare capacity by said statistical multiplexing.

3. A method for using the complete resource capacity of a synchronous digital hierarchy network, subject to a protection mechanism, in the presence of a data packet network, said network comprising nodes bidirectionally transmitting time division multiplex (TDM) and data traffic over Working and Protection capacity/channels, wherein in case of a failure at the affected nodes, said method comprising:

cutting the working capacity;

subjecting the TDM traffic to said protection mechanism, and shifting the TDM traffic over the protection capacity;

shifting a part of high priority data traffic over the protection capacity; and a part of low-priority data traffic, transported over the protection capacity in normal conditions, shares a remaining protection capacity with a low-priority part of the data traffic, transported over the working capacity in normal conditions, wherein the complete protection capacity is used to carry data traffic in both normal and failure conditions, wherein said network node comprises:

a first switching element to switch the TDM traffic over the TDM part of the working channels, in the non-failure condition, or over the protection capacity in case of failure;

a second switching element for the data traffic, comprising circuits to perform the following actions:

recognizing the class of service of the input data, wherein said input data comprises said high or low priority data traffic; and assigning the data traffic to a correct output on said working or protection capacity in both non-failure and failure conditions, so as in failure conditions all the high priority data traffic is switched over the protection capacity, and the low priority data traffic is switched over the protection capacity according to said function of statistical multiplexing, wherein said second switching element comprises:

an input mapper module for the said recognizing of the class of service of the input data;

a load balancer module for the said assigning of the data traffic to the correct output in both non-failure and failure conditions, said load balancer comprising circuits for:

dividing the high priority from the low priority data by mapping them in different Virtual Containers (VCs) of the synchronous digital hierarchy frames;

applying the said function of statistical multiplexing for the low priority data traffic to access the dedicated VCs; and balancing the low priority data traffic in both non-failure and failure conditions, so as in failure conditions said low priority data traffic is switched over the protection capacity according to said function of statistical multiplexing.

* * * * *